Patented Apr. 15, 1952

2,592,977

UNITED STATES PATENT OFFICE 2,592,977

PRODUCTION OF BUTADIENE MONOCHLOROHYDRIN

Warren L. Towle, Akron, Ohio, assignor, by mesne assignments, to Columbia-Southern Chemical Corporation, Pittsburgh, Pa., a corporation of Delaware No Drawing. Application April 26, 1946, Serial No. 665,317

9 Claims. (Cl. 260—634)

The present invention relates to the production of chlorohydrins and more particularly to the preparation of a monochlorohydrin of a diolefin, butadiene-1,3.

Processes for the preparation of chlorohydrins from unsaturated organic compounds are well known. Such processes are, however, subject to various operating difficulties. For example, hypochlorination of olefins is most logically effected by the direct reaction of hypochlorous acid therewith, but solutions of hypochlorous acid are relatively unstable and frequently contain decomposition products which induce objectionable side reactions forming wasteful by-products. In an endeavor to improve both quantity and quality of the chlorohydrins produced, operators have preferred to generate hypochlorous acid in situ from a hypochlorite contained in solution and with which the olefin is contacted.

Other methods have also been devised, but insofar as I am aware, they have been directed primarily to the hypochlorination of monounsaturated hydrocarbons. Although these methods have been indicated to be applicable to diolefins, the products thereof are dichlorohydrins rather than monochlorohydrins. It has not been possible so to control these processes that the addition reaction will involve but one of the olefinic linkages.

The primary object of my invention is to provide a method of procedure whereby the hypochlorination of a dioelfin, butadiene-1,3 can be controlled to yield a monochlorohydrin rather than a dichlorohydrin.

Other objects and advantages of the invention will be evident from the following description of certain preferred embodiments thereof.

The preparation of butadiene monochlorohydrin, as contemplated by my invention is comparatively simple. Butadiene is dissolved in a cooled aqueous solution of butadiene monochlorohydrin, a solution of hypochlorous acid is combined therewith under conditions of vigorous agitation, and the mixed solutions are maintained below a temperature of 15° C. while the reaction proceeds. Thereafter the reaction mixture is apportioned, part being recycled to form the solvent medium for additional butadiene while the remainder undergoes treatment for the recovery of butadiene monochlorohydrin.

Despite the simple mechanics of my process, however, certain conditions must be established and observed throughout to insure optimum yields. Inasmuch as high ratios of butadiene concentration to butadiene monochlorohydrin concentration favor limitation of the hypochlorous acid addition to the saturation of only one of the two unsaturated linkages and since, from the standpoint of product recovery, it is desirable to produce as concentrated a solution of butadiene monochlorohydrin as is consistent with good yield, sufficient butadiene is introduced into the butadiene monochlorohydrin solution to result in substantial saturation thereof. Under ordinary conditions of pressure and at reduced temperatures butadiene is sufficiently soluble in water that it is possible to obtain a solution wherein the molecular ratio of butadiene to butadiene monochlorohydrin is appreciable. This ratio could be made even greater by operating under increased pressures. No attempt has been made to ascertain the upper limit of this molecular ratio of butadiene to butadiene monochlorohydrin. I have determined, however, that this ratio should be in excess of 0.1 at all times and preferably this ratio is maintained in excess of 0.2.

A highly satisfactory method of obtaining the butadiene-butadiene monochlorohydrin reaction liquor is to pass the cooled monochlorohydrin solution downwardly through a packed absorption tower against a current of butadiene. As the butadiene-butadiene monochlorohydrin solution leaves the bottom of the tower, it is mixed with a solution of hypochlorous acid of low concentration under conditions of vigorous agitation and is pumped through a heat exchanger cooled with brine to maintain the reaction mixture below 15° C.

Inasmuch as the concentration of hypochlorous acid directly determines the amount of butadiene monochlorohydrin in the final product, it also determines the concentration of butadiene monochlorohydrin in the recycled reaction liquor, which in turn influences the solubility of butadiene in the recycled reaction liquor. Thus a low concentration of hypochlorous acid in the feed solution aids in maintaining the high ratio of butadiene to butadiene monochlorohydrin previously indicated to be desirable. The hypochlorous acid concentration must be below 50 gms. per liter of feed solution and it is preferred that the concentration fall within the range of from 5 to 15 gms. of hypochlorous acid per liter of feed solution. This low concentration of hypochlorous acid in the feed solution must also be correlated with the butadiene content of the butadiene monochlorohydrin recycled reaction liquor. By maintaining a 150% or greater excess of butadiene in the butadiene monochlorohydrin reaction liquor leaving the absorption tower at an approximate concentration of 1.5 grams per liter for admixture with the hypochlorous acid feed solution of a concentration of about 10 grams per liter, it has been possible to attain maximum yields. Excesses of butadiene considerably above 150% have little apparent effect on the yield. Amounts of butadiene below this figure, however, materially reduce the yield. Expressed differently, I have determined that the molecular ratio of dissolved butadiene in the recycled reaction liquor leaving the absorption tower to the hypochlorous acid in the feed solution should be at least 1.3 and preferably should be in excess of 2.5. This balance is readily established and maintained in the operation of a continuous process.

It is readily apparent that the intermixing of the butadiene-monochlorohydrin reaction liquor and the hypochlorous acid feed liquor should be as rapid as possible to avoid existence of localized relatively high concentrations of hypochlorous acid. Where sufficient hypochlorous acid is present to exhaust the butadiene available for reaction therewith, the monochlorohydrin will undergo reaction with the remainder of the hypochlorous acid, resulting in undesired formation of butadiene dichlorohydrin. The intermixing of reactant solutions may be accomplished in many ways but the most convenient is a direct feed of the hypochlorous acid solution into the casing of a centrifugal pump moving the monochlorohydrin reaction liquor from the absorption tower to the heat exchanger. In this manner the mixing takes place with the greatest possible turbulence.

The reaction mixture circulates through a heat exchanger in order that the temperature thereof is maintained below about 15° C. At temperatures above 15° C., an undesirable side reaction reduces the yield of monochlorohydrin. It should also be noted that by holding the temperature of the reaction liquor below 15° C. the absorption of butadiene in the recycled portion is facilitated. Of course, the temperature of the reaction liquor may be reduced considerably below 15° C. with a corresponding increase in the yield of monochlorohydrin. Best yields are obtained when the temperature is held in the range of from 0 to 5° C.

The results of a number of experiments are presented in the following table.

ulated data indicates clearly the effect of the hypochlorous acid concentration upon the yield; that is, the yield increases as the hypochlorous acid concentration decreases. It is believed that this effect is due largely to the change in the molecular ratio of the butadiene to the butadiene monochlorohydrin. The concentrations of butadiene and hypochlorous acid in the reaction liquor are substantially the same in the first six experiments, but the concentration of butadiene monochlorohydrin is roughly proportional to the hypochlorous acid concentration in the feed liquor. This change in concentration ratios naturally affects the amount of butadiene monochlorohydrin which can react with the hypochlorous acid to form butadiene dichlorohydrin. In the final five experiments the hypochlorous acid feed concentration is nearly constant while the amount of butadiene in the reaction liquor is varied. These final experiments illustrate the effect of an excess of butadiene upon the yields of butadiene monochlorohydrin.

In the preceding examples, the hypochlorous acid employed was substantially pure. Decomposition of hypochlorous acid yields chloric acid and chlorine. The presence of chlorine in the hypochlorous acid feed liquor results in butadiene dichloride formation together with some chlorine addition to the butadiene monochlorohydrin, thus reducing the yield of butadiene monochlorohydrin. Manifestly therefore, hypochlorous acid substantially free of chlorine should be employed in my process. For optimum results, it is preferred that the hypochlorous acid contain less than 0.1 equivalent of chloride ion per equivalent of hypochlorous acid. Hypochlorous acid solutions may be freed from contaminating chlorine, present as the result of decomposition, by simple blowing with air, and thus prepared for use in the hypochlorination reaction.

Hypochlorination of butadiene under the conditions set forth hereinbefore enables production of high yields of butadiene monochlorohydrin. The specified conditions, of no importance in the hypochlorination of mono-unsaturated olefins or the formation of dichlorohydrins, are essential to the production of butadiene monochlorohydrin in optimum yields.

What I claim is:

1. A process of manufacturing butadiene monochlorohydrin which comprises mixing hypochlorous acid solution containing less than 50

*Table I*

| Example No. | 1 | 2 | 3 | 4 | 5 | 6 | 7 | 8 | 9 | 10 | 11 |
|---|---|---|---|---|---|---|---|---|---|---|---|
| Concentration of HOCl in feed (gms./liter) | 40.5 | 30.2 | 28.4 | 21.5 | 10.8 | 2.9 | 9.95 | 10.05 | 10.0 | 9.95 | 9.95 |
| HOCl feed rate (mls./min.) | 250 | 250 | 250 | 250 | 250 | 250 | 1,250 | 1,350 | 1,250 | 1,050 | 800 |
| HOCl feed rate (gms./hr.) | 608 | 456 | 426 | 323 | 162 | 43 | 747 | 815 | 750 | 600 | 477 |
| Reaction temp. (° C.) | 1 | 1 | 1 | 1 | 1 | 1 | 2.0 | 2 | 1.5 | 1 | 1 |
| HOCl and Cl$_2$ in reaction liquor (g./l HOCl) | 0.03 | 0.13 | 0.01 | 0.01 | 0.01 | 0.2 | | | | | |
| Butadiene in reaction liquor (g./l) | 2.2 | 1.0 | 0.8 | 1.2 | 1.0 | 0.9 | 1.3 | 0.8 | 1.6 | 1.5 | 1.5 |
| Butadiene solution, recirculation rate (gals./min.) | 6.0 | 6.0 | 6.0 | 6.0 | 6.0 | 6.0 | 3.0 | 6.1 | 4.0 | 6.1 | 6.0 |
| Total unsaturate in reaction liquor as g./l Monochlorohydrin | 57.0 | 46.7 | 45 | 35.2 | 19.9 | 5.4 | 15.1 | 16.4 | 16.5 | 17.6 | 17.5 |
| Per cent yield of unsaturates, basis HOCl | 69.4 | 74.8 | 78.2 | 80.7 | 90.9 | 92.5 | 70 | 79 | 81 | 87 | 89 |

In the experiments, above tabulated, certain of the conditions hereinbefore specified as affecting the operation of the process have been standardized, the better to illustrate the effect of variations of the remaining conditions. The tabulated grams of HOCl per liter of hypochlorous acid solution, under conditions of vigorous agitation, with butadiene dissolved in an aqueous solution of butadiene monochlorohydrin at a temperature below 15° C., the molecular ratio of butadiene to butadiene monochlorohydrin added being maintained in excess of 0.1 and the molecular ratio of butadiene in solution to the hypochlorous acid being maintained in excess of 1.3.

2. A process of manufacturing butadiene monochlorohydrin which comprises reacting hypochlorous acid containing less than 50 grams of HOCl per liter of hypochlorous acid solution and less than 0.1 equivalent of chloride ion per equivalent of hypochlorous acid with butadiene dissolved in an aqueous solution of butadiene monochlorohydrin at a temperature below 15° C. and under conditions of vigorous agitation, the molecular ratio of butadiene to butadiene monochlorohydrin in solution being maintained in excess of 0.1 and the molecular ratio of butadiene added to the hypochlorous acid being maintained in excess of 1.3.

3. A process of manufacturing butadiene monochlorohydrin which comprises mixing hypochlorous acid solution which contains less than 50 grams of HOCl per liter of hypochlorous acid solution, said solution containing less than 0.1 equivalent of chloride ion per equivalent of hypochlorous acid, under conditions of vigorous agitation with butadiene dissolved in an aqueous solution of butadiene monochlorohydrin at a temperature below about 5° C., the molecular ratio of butadiene to butadiene monochlorohydrin added being maintained in excess of 0.2 and the molecular ratio of butadiene in solution to the hypochlorous acid being maintained in excess of 2.5.

4. A process of manufacturing butadiene monochlorohydrin which comprises mixing an aqueous solution of hypochlorous acid of a concentration of from 5 to 15 grams per liter and containing less than 0.1 equivalent of chloride ion per equivalent of hypochlorous acid under conditions of vigorous agitation with butadiene dissolved in an aqueous solution of butadiene monochlorohydrin at a temperature below about 5° C., the molecular ratio of butadiene to butadiene monochlorohydrin added being maintained in excess of 0.2 and the molecular ratio of butadiene in solution to the hypochlorous acid being maintained in excess of 2.5.

5. A process of manufacturing butadiene monochlorohydrin which comprises circulating an aqueous solution of butadiene monochlorohydrin through a continuous system, dissolving sufficient butadiene in the circulating monochlorohydrin solution to attain a molecular ratio of butadiene to butadiene monochlorohydrin in excess of 0.2, mixing an aqueous solution of hypochlorous acid of a concentration of from 5 to 15 grams per liter and containing less than 0.1 equivalent of chloride ion per equivalent of hypochlorous acid with the butadiene-butadiene monochlorohydrin solution, regulating the input of hypochlorous acid to maintain a molecular ratio of butadiene added to hypochlorous acid in excess of 2.5, maintaining the temperature of the mixed solutions below about 5° C. during the course of the reaction between the hypochlorous acid and butadiene, separating a portion of the reaction mixture to enable recovery therefrom of butadiene monochlorohydrin, and recycling the remainder of the reaction mixture.

6. A process of preparing butadiene monochlorohydrin which comprises dissolving sufficient butadiene in a butadiene monochlorohydrin aqueous solution to establish a molecular ratio of butadiene to butadiene monochlorohydrin in excess of 0.2, vigorously mixing an aqueous solution of hypochlorous acid containing 5 to 15 grams per liter of hypochlorous acid with the butadiene-butadiene monochlorohydrin solution, regulating the input of hypochlorous acid to maintain a molecular ratio of butadiene added to hypochlorous acid in excess of 2.5, maintaining the temperature of the mixed solutions at below about 5° C. during the course of the reaction between the hypochlorous acid and the butadiene, separating a portion of the reaction mixture to enable recovery therefrom of butadiene monochlorohydrin, and recycling the remainder of the reaction mixture.

7. A method of preparing butadiene monochlorohydrin which comprises successively dissolving butadiene in an aqueous solution of butadiene monochlorohydrin, vigorously mixing aqueous hypochlorous acid containing up to 50 grams per liter of hypochlorous acid with the butadiene solution while maintaining the temperature below 15° C., the molecular proportion of butadiene to hypochlorous acid being at least 1.3, adding further butadiene to the resulting mixture after the hypochlorous acid has been consumed, and reacting the resulting product with further hypochlorous acid.

8. A process of preparing butadiene monochlorohydrin which comprises dissolving butadiene in butadiene monochlorohydrin and water to form a solution thereof in which the molecular ratio of butadiene to butadiene monochlorohydrin in solution is in excess of 0.1, mixing said solution with an aqueous solution of hypochlorous acid which contains less than 50 grams of HOCl per liter of hypochlorous acid solution, maintaining the temperature of mixing below 15° C. while proportioning the amounts of said solutions to insure maintenance of a molecular ratio of butadiene in solution to hypochlorous acid in excess of 1.3, withdrawing at least a portion of the butadiene monochlorohydrin thus produced from the reaction mixture, dissolving further butadiene therein and recycling said solution to the reaction mixture.

9. The process of claim 8 wherein the temperature of mixing is maintained below 15° C. and the concentration of the hypochlorous acid solution is maintained below 15 grams per liter.

WARREN L. TOWLE.

REFERENCES CITED

The following references are of record in the file of this patent:

UNITED STATES PATENTS

| Number | Name | Date |
| --- | --- | --- |
| 1,456,916 | Curme et al. | May 29, 1923 |
| 1,456,959 | Young | May 29, 1923 |
| 1,465,595 | Brooks | Aug. 21, 1923 |